May 2, 1961     R. J. KOUTNIK     2,982,294

CONTROL VALVE

Filed Oct. 17, 1958     3 Sheets-Sheet 1

May 2, 1961  R. J. KOUTNIK  2,982,294
CONTROL VALVE
Filed Oct. 17, 1958  3 Sheets-Sheet 2
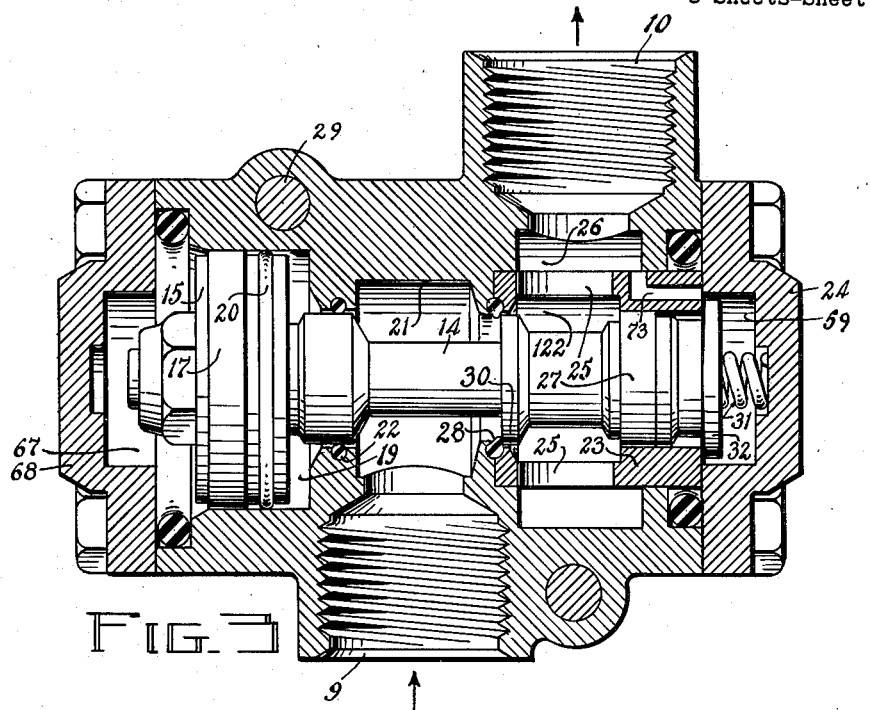
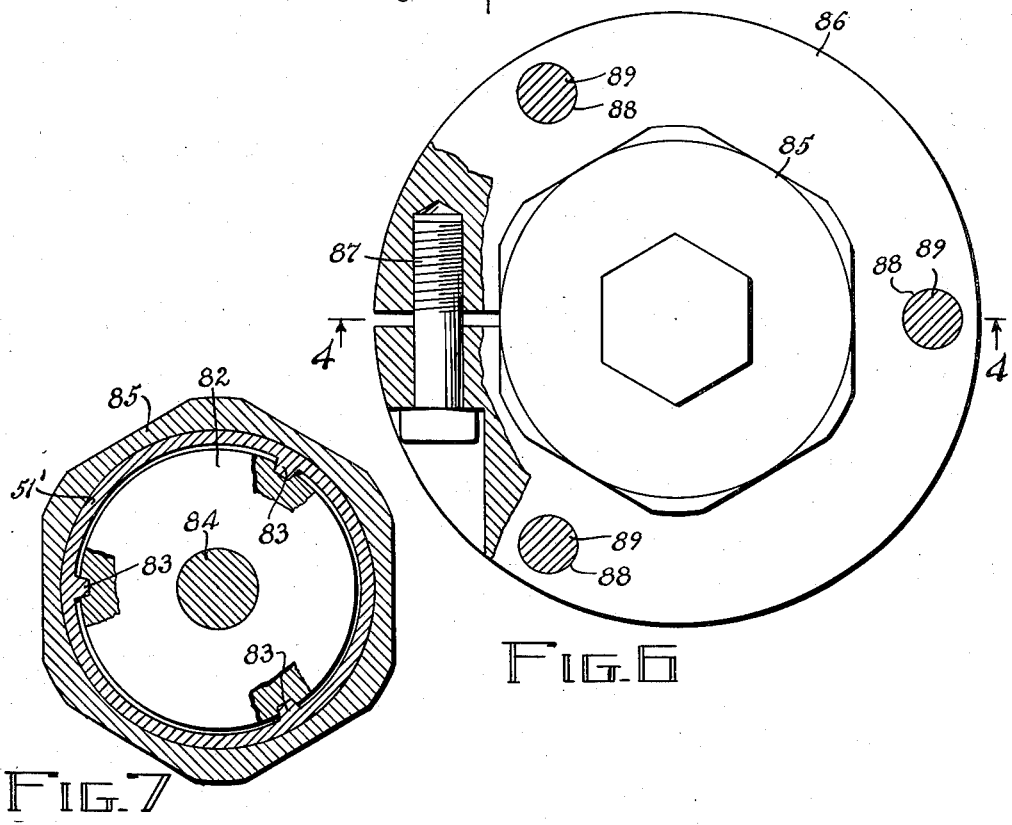

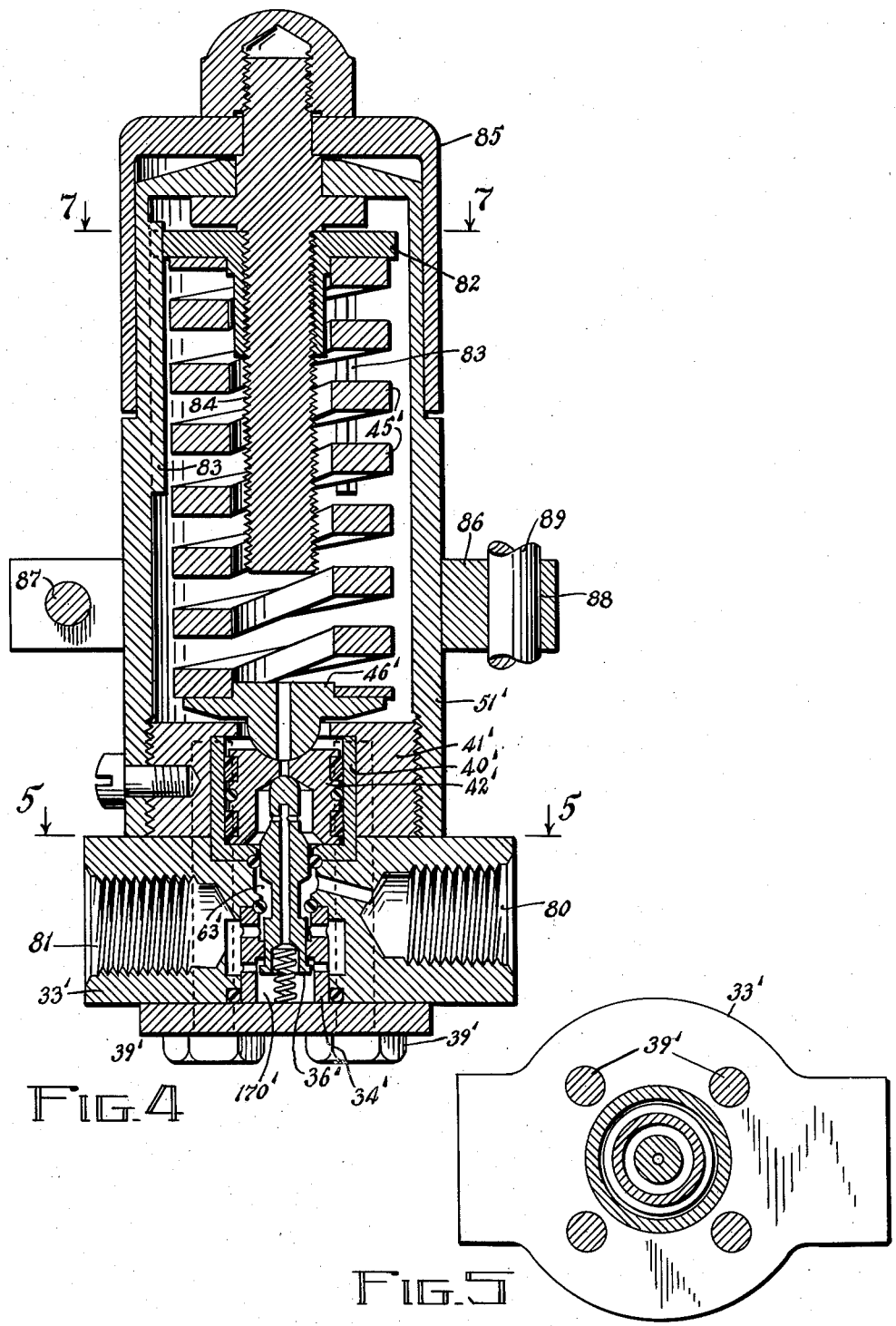

United States Patent Office 2,982,294
Patented May 2, 1961

2,982,294
CONTROL VALVE

Rodrick J. Koutnik, Vista, Calif., assignor to Clary Corporation, San Gabriel, Calif., a corporation of California Filed Oct. 17, 1958, Ser. No. 767,809
3 Claims. (Cl. 137—116.5)

This invention relates to valves and has particular reference to pressure regulator valves for maintaining transmitted fluids under constant and predetermined pressure regardless of varying conditions under which the fluid is used.

Pressure regulators of the prior art, although generally satisfactory for controlling fluid under light or medium pressures, often encounter difficulty when used under relatively high pressures of, for instance, 6,000 pounds per square inch.

For example, because of the lag of the regulator valve parts due to inertia or frictional forces, the regulator may, under abrupt demand conditions, momentarily permit a greater pressure to be transmitted down stream from the regulator than the preset pressure to which the regulator is set. Such condition can also occur due to expansion of the fluid or behavior of fluid controlled devices located down stream from the regulator.

Also, when utilizing O-rings or similar soft resilient elements as valve seats, the high fluid pressures encountered tend to dislodge such elements from their sockets.

It therefore becomes a principal object of the present invention to provide a pressure regulator capable of controlling fluids under relatively high pressures.

Another object is to provide a pressure regulator capable of controlling transmitted fluid at a constant pressure even if the down stream pressure tends to increase beyond that at which the regulator is set.

Another object is to provide a pressure regulator embodying O-rings or like elements in which any tendency for O-ring blowout is reduced.

Another object is to provide a light, compact pressure regulator for controlling fluids under relatively high pressures.

Another object is to provide a pressure regulator which does not have to be removed from the fluid line for normal servicing operations.

The manner in which the above and other objects of the invention are accomplished will be readily understood on reference to the following specification when read in conjunction with the accompanying drawings, wherein:

Fig. 3 is a sectional plan view through the main valve and is taken along the line 3—3 of Fig. 1.

Fig. 4 is a longitudinal sectional view through a modified form of the pilot valve and is taken along the line 4—4 of Fig. 6.

Fig. 5 is a sectional plan view taken along the line 5—5 of Fig. 4.

Fig. 6 is a plan view, with parts in section, of the pilot valve of Fig. 4.

Fig. 7 is a sectional plan view taken substantially along the line 7—7 of Fig. 4.

Figure 1:
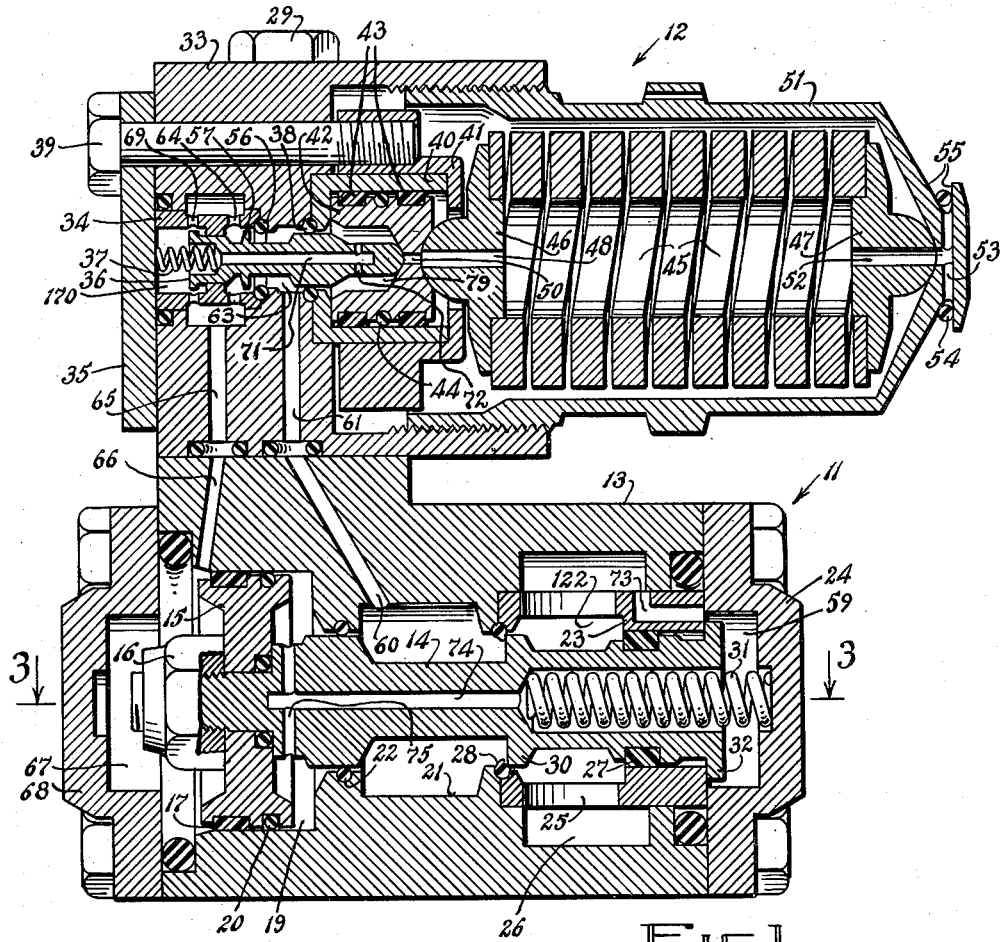
Fig. 1 is a longitudinal sectional view through a combined main and pilot regulator valve embodying a preferred form of the present invention.
Figure 2:
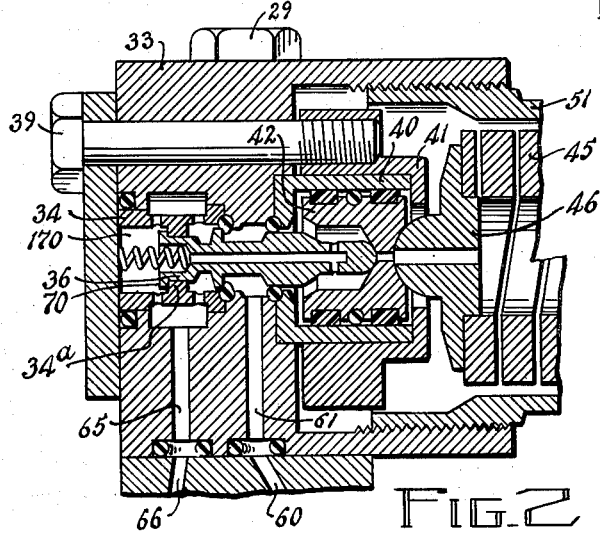
Fig. 2 is a view similar to Fig. 1, but with parts broken away, illustrating the pilot valve in a position assumed when a preset pressure is reached.

Referring in particular to Figs. 1 to 3, inclusive, the regulator comprises a main regulator valve, generally indicated at 11, and a pilot regulator valve, generally indicated at 12.

The main regulator valve comprises a valve body or casing 13 having an inlet port 9 for connection to a source of fluid under pressure, and an outlet port 10 for connection to a suitable fluid utilization device which is to receive fluid at a constant preset pressure and under possibly heavy flow conditions.

The body 13 has a series of aligned chambers in which is located a valve member 14. The latter has a piston 15 attached thereto by a nut 16 which is mounted on a screw threaded extension of the valve member.

The piston has a guide ring 17 of plastic material which is fitted in a groove formed in the periphery of the piston and slides in a counterbore formed in the left hand end of the body 13. An O-ring 20 of resilient plastic material is also fitted in a groove in the piston and forms a sliding seal.

An intake chamber 21 formed in the body 13 communicates with the intake port 9 and is isolated from the back piston chamber 19 by an O-ring 22 fitted in an internal groove formed in the body 13 and slideably sealing against the periphery of the valve member.

An outlet chamber 122 is formed in a sleeve 23 which is fitted in a counterbore formed in the right hand end of the body 13 and held in place by an end cap 24. Radial openings 25 in the sleeve 23 provide communication between the chamber 122 and an annular channel 26 opening into the outlet port 10.

The valve member is provided with a ring 27 of plastic material which is fitted in a groove therein and slideably guided in a bore formed in the right hand end of the sleeve 23 whereby to support the right hand end of the valve member.

An O-ring 28 is clamped in mating grooves formed in the body 13 and sleeve 23 to cooperate with a lip 30 on the valve member when the latter is in its illustrated left hand closed position whereby to seal off the outlet chamber from the inlet chamber. The valve member is normally held in its closed position by a compression spring 31 effective to limit a flange 32 on the valve member against the right hand end of the sleeve 23.

The pilot regulator 12 comprises a valve body or casing 33 suitably attached by bolts, i.e. 29, to the body 13. A sleeve 34 is held in a counterbore formed in the body 33 by an end cap 35 to slideably support one end of a poppet or valve member 36 which is urged to the right by a compression spring 37 extending between the end cap and the valve member. The poppet is slideably supported at its right hand end by a sealing O-ring 38 which is clamped in mating grooves formed in the body 33 and in a cylindrical cup 40. The latter is held in place by a cap 41 which is secured against the cup by bolts, i.e. 39, passing through the end cap and body.

The tip of the poppet 36 is semi-spherical in shape and forms a valve normally fitting against a valve seat formed in a plunger 42. The latter carries a pair of plastic guide rings 43 which slide in the cup 40, an O-ring 44 being provided intermediate the rings 43 to form a sliding seal between the plunger and the cup.

The plunger 42 and poppet 36 are normally held in their left hand positions shown in Fig. 1 by a pressure control spring 45 interposed between spring seats or keepers 46 and 47. The seat 46 engages the plunger 42 and has a passage 48 therein communicating with a passage 50 formed in the plunger. The seat 47 engages the head of a spring retaining shell 51 which is adjustably threaded into the pilot valve body 33. A passage 52 in the keeper 47 communicates with radially extending passages 53 in the head of the shell. An O-ring 54 is wedged between diverging side surfaces 55 formed in the head of the shell whereby to form a one-way valve, permitting fluid under pressure to escape from inside the shell past the O-ring and into the atmosphere. By virtue of its wedging action, however, the O-ring will prevent air from the atmosphere from passing into the interior of the shell.

It will be noted that an O-ring 56 is clamped in mating grooves in the pilot regulator body 33 and the sleeve 34 to form a valve seat cooperating with a lip 57 formed on the poppet 36.

Describing now the operation of the regulator, the inlet port 9 is connected to a source of fluid under a greater pressure than that demanded by a fluid utilizing device connected to the outlet port 10. Also, the shell 51 is screwed in or out to adjust the compression of spring 45 to effect the desired fluid pressure to be applied to the outlet. To facilitate such adjustment, a graduated scale (not shown) may be provided on the periphery of the shell and read in reference to an index mark located on the body 33. The fluid pressure applied to the inlet chamber 21 communicates, through aligned passages 60 and 61 in the valve bodies 13 and 33, respectively, with a valve chamber 63 intermediate the O-rings 38 and 56. Since the valve member 36 is normally held in its left hand or open position by the relatively heavy spring 45, the valve seat 57 is open, permitting fluid pressure to be applied through openings 64 in the sleeve 34, and aligned passages 65 and 66 in the valve bodies, to a forward piston chamber 67 formed by an end cap 68 attached to the valve body 13. Accordingly, the valve member 14 is moved to the right to its open position against the action of its spring 31, permitting the fluid to pass between lip 30 and O-ring 28 into the outlet chamber 122 and on into the outlet port 10.

The pilot regulator 12 is effective to maintain the pressure in the piston chamber 67 at the pressure to which the shell 51 is set, and for this purpose, as the pressure in the chamber 67 approaches the predetermined value, such fluid pressure will be applied through openings 69 in the sleeve 34, through an axial passage 71 in the poppet and through radial passages 72 into a chamber 79 formed by the plunger 42 and cylinder cup 40. Accordingly, the plunger 42 will move to the right against the action of spring 45, permitting the poppet to follow under the action of its spring 37 until the lip 57 engages the O-ring 56, as shown in Fig. 2. At such time, a flange 70 on the poppet engages the left hand end of a shoulder 34a on the sleeve 34 to limit the poppet against further rightward movement.

Should the fluid in the chamber 67 develop a pressure greater than that predetermined by the spring 45, due possibly to large surges of fluid and inertia of the movable parts or due to sudden back-up pressures developed downstream of the regulator, such pressure will be applied along the axial passage 71 in the poppet and into the chamber 79. Accordingly, it will force the plunger 42 to the right beyond its position shown in Fig. 2, uncovering the passage 50 so that fluid may pass into the shell 51 and escape through passages 52 and 53 to the atmosphere, thus reducing the fluid pressure in chamber 67 to the proper limit whereupon the spring will be effective to close passage 50.

As the pressure in the outlet port 10 reaches the preset limit, such pressure is communicated, through a passage 73, to a chamber 59 at the right hand end of the valve member 14 of the main valve. Such pressure is also applied through an axial passage 74 in the valve member and through radial passages 75 to the back piston chamber 19. Accordingly, as the pressure in the outlet port (and therefore in chamber 19) reaches the preset limit, it will balance out the force applied by the preset pressure in chamber 67, permitting the spring 31 to move the valve member 14 to its closed position until the outlet pressure again drops slightly below such limit.

Also, in accordance with the present invention it will be noted that the "blow-out" pressure tending to force the O-rings 22 and 38 out of their respective grooves is less than the total up-stream pressure, being equal only to the differential between the up-stream pressure and the regulated pressure, thereby materially reducing any tendency for the fluid to dislodge such O-rings.

Figs. 4 to 7, inclusive, illustrate a modified form of pressure regulator valve which may be constructed as a single unit independent of the main valve. In this construction, elements similar to those found in the pilot valve in the preferred form of Figs. 1 to 3 are indicated by corresponding but primed reference numerals.

This regulator comprises a body 33' having an inlet port 80 communicating with a chamber 63' and an outlet port 81 communicating with the end chamber 170'.

The cap 41' for retaining the cup 40' in place is somewhat modified from the corresponding cap in Figs. 1 and 2 in that its periphery is provided with threads upon which is threaded a spring enclosing shell 51'. The cap 41' is fixed to the body 33' by bolts 39'.

An internally threaded disc 82 is provided for slideable lengthwise movement within the shell 51', being prevented from rotation by ribs 83 integral with the shell. A spring 45' is interposed between the disc 82 and a spring seat or keeper 46' and its compression is adjusted by a screw 84 (threaded into the hub of disc 82). The latter is suitably attached to a knob 85 which is rotatable about the shell 51' and may have a graduated scale therearound which cooperates with an index mark on the shell to indicate a control pressure at which the regulator is set.

A split annular mounting flange 86 (see also Fig. 6) is slideably mounted on the shell 51' and is clamped in any desired position thereon by a clamp screw 87. The flange 86 has mounting holes 88 for mounting the regulator, as by bolts 89, to various bases, brackets or the like.

Although I have described my invention in detail and have therefore used certain terms and languages herein, it is to be understood that the present specification is illustrative rather than restrictive, and that changes and modifications may be made without departing from the spirit or scope of the invention as set forth in the claims appended hereto.

Having thus described the invention, what I desire to secure by United States Letters Patent is:

1. A pressure regulator comprising a body having a a bore therein and counterbores at opposite ends of said bore forming a pair of spaced annular shoulders, a first annular member in one of said counterbores, a plunger slideable axially in said annular member and having an exhaust vent therein, a first resilient ring clamped between said annular member and one of said shoulders, a second annular member in the other of said counterbores, a second resilient ring clamped between said second annular member and the other of said shoulders, an elongate valve member moveable endwise in said bore, said valve member being sealingly slideable in said first ring and having a valve seat engageable with said second ring, an inlet port in said body communicating with said bore intermediate said rings, an outlet port in said body communicating with the interior of said second annular member, said valve member having a passage extending longitudinally therein and communicating the interior of said second annular member with the interior of said first annular member intermediate said plunger and said first ring, means on said valve member effective to close said exhaust vent upon engagement of said plunger with said valve member, first spring means urging said plunger toward said valve member, and second spring means urging said valve member toward said plunger, said plunger being moveable away from said valve member by fluid pressure transmitted to said plunger from said outlet port after said valve seat engages said second ring and when fluid pressure in said outlet port exceeds a predetermined amount determined by said first spring means whereby to open said exhaust vent.

2. A pressure regulator comprising a body having a bore therein and counterbores at opposite ends of said bore forming a pair of spaced annular shoulders, a first annular member in one of said counterbores, a plunger slideable axially in said annular member and having an exhaust vent therein, a first resilient ring clamped between said annular member and one of said shoulders, a second annular member in the other of said counterbores, a second resilient ring clamped between said second annular member and the other of said shoulders, an elongate valve member moveable endwise in said bore, said valve member being sealingly slideable in said first ring and having a valve seat engageable with said second ring, said first ring slideably supporting said valve member adjacent one end of said valve member, an inlet port in said body communicating with said bore intermediate said rings, an outlet port in said body communicating with the interior of said second annular member, said valve member having a passage extending longitudinally therein and communicating the interior of said second annular member with the interior of said first annular member intermediate said plunger and said first ring, said second annular member slideably supporting said valve member adjacent the opposite end of said valve member, means on said valve member effective to close said exhaust vent upon engagement of said plunger with said valve member, first spring means urging said plunger toward said valve member, and second spring means urging said valve member toward said plunger, said plunger being moveable away from said valve member by fluid pressure transmitted to said plunger from said outlet port after said valve seat engages said second ring and when fluid pressure in said outlet port exceeds a predetermined amount determined by said first spring means whereby to open said exhaust vent.

3. A pressure regulator comprising a body having a bore therein and a pair of spaced annular shoulders at opposite ends of said bore, a first annular member at one end of said bore, a plunger slideable axially in said annular member and having an exhaust vent therein, a first resilient ring clamped between said annular member and one of said shoulders, a second annular member at the opposite end of said bore, a second resilient ring clamped between said second annular member and the other of said shoulders, an elongate valve member moveable endwise in said bore, said valve member being sealingly slideable in said first ring and having a valve seat engageable with said second ring, said first ring slidingly supporting said valve member adjacent one end of said valve member, an inlet port in said body communicating with said bore intermediate said rings; an outlet port in said body communicating with the interior of said second annular member, said valve member having a passage extending longitudinally therein and communicating the interior of said second annular member with the interior of said first annular member intermediate said plunger and said first ring, said second annular member slidingly supporting said valve member adjacent the opposite end of said valve member; said valve member being effective to close said exhaust vent upon engagement of said plunger with said valve member, adjustable spring means for urging said plunger toward said valve member, and second spring means for urging said valve member toward said plunger, said adjustable spring means being relatively stronger than said second spring means, said plunger being movable away from said valve member after said valve seat engages said second ring and when fluid pressure in said outlet port and in said passage exceeds a predetermined amount determined by said adjustable spring means whereby to open said exhaust vent.

References Cited in the file of this patent

UNITED STATES PATENTS

| | | |
|---|---|---|
| 941,153 | Krichbaum | Nov. 23, 1909 |
| 2,688,975 | Born | Sept. 14, 1954 |
| 2,731,975 | Boals | Jan. 24, 1956 |
| 2,746,484 | Flower | May 22, 1956 |
| 2,789,574 | Tucker | Apr. 23, 1957 |
| 2,841,173 | Masom | July 1, 1958 |